INVENTOR.
ANDREE R. BARRESI

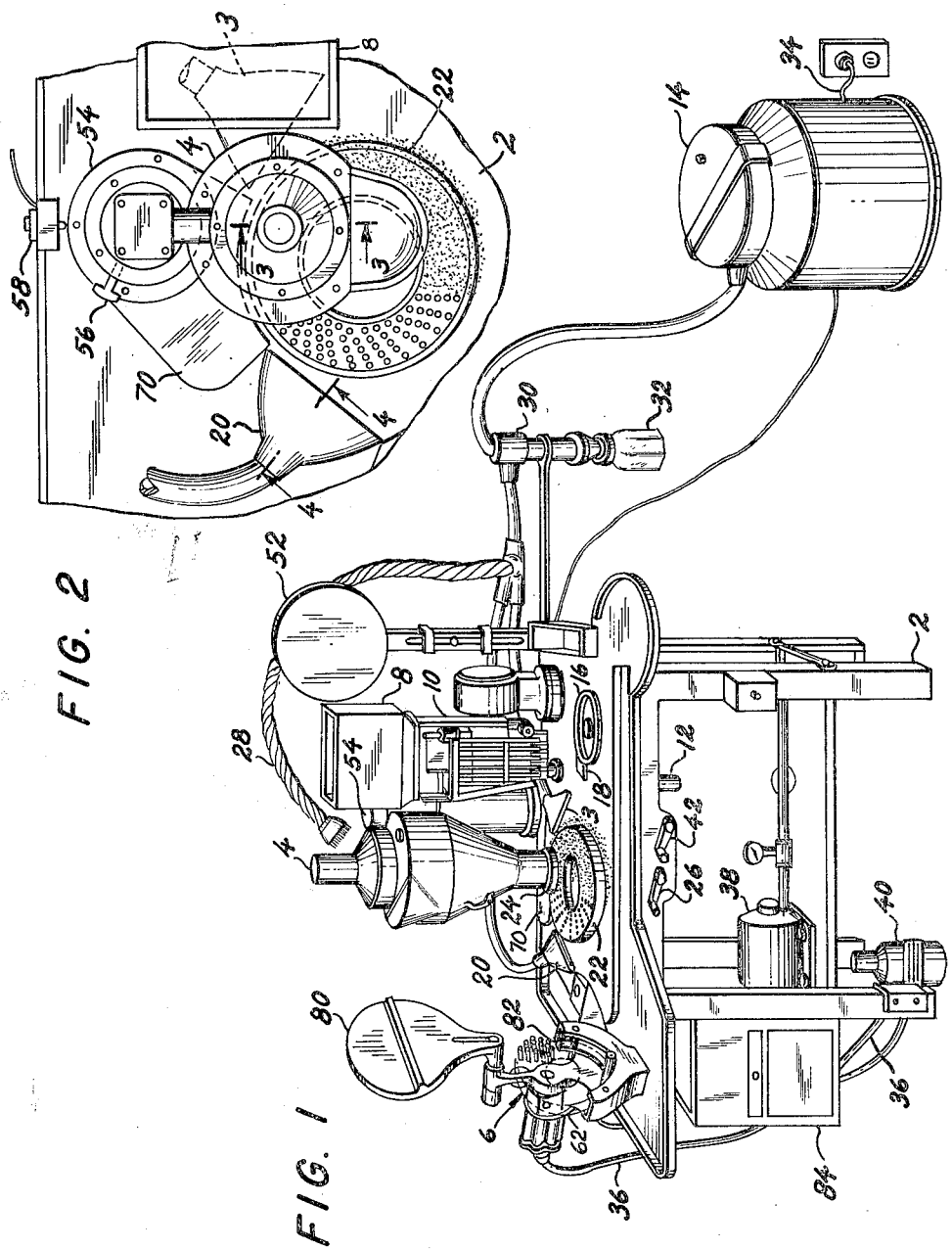

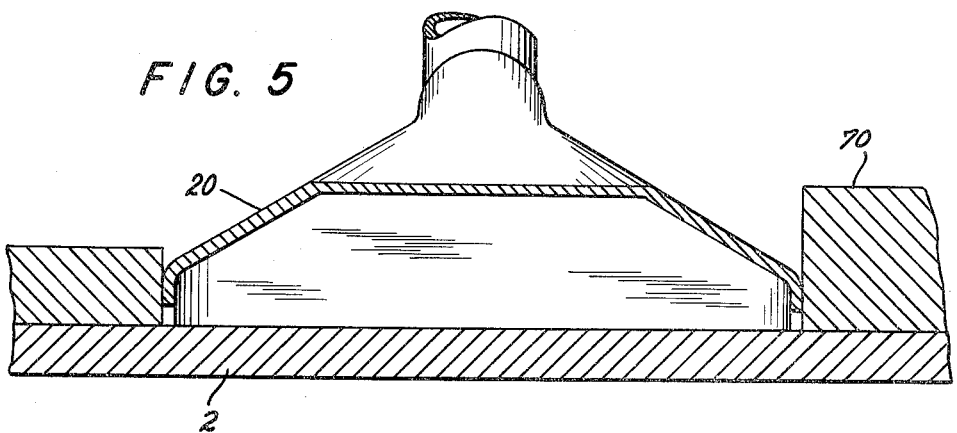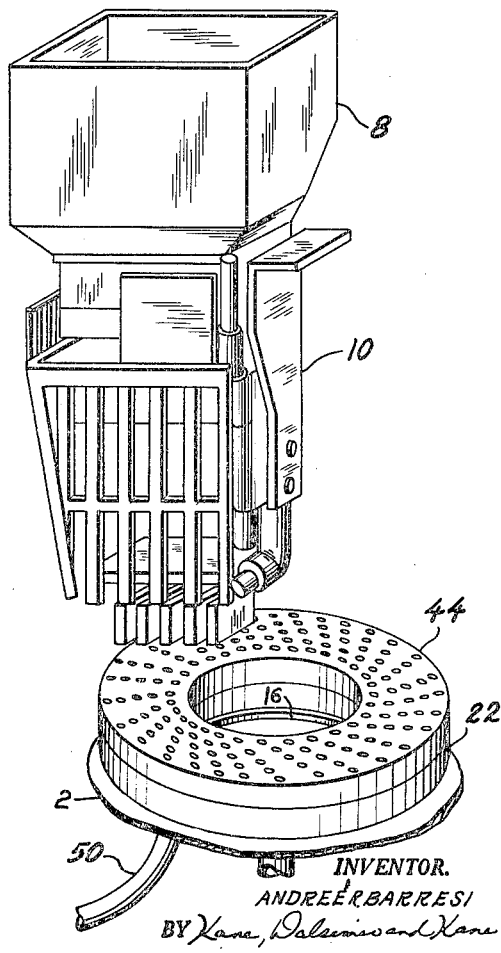

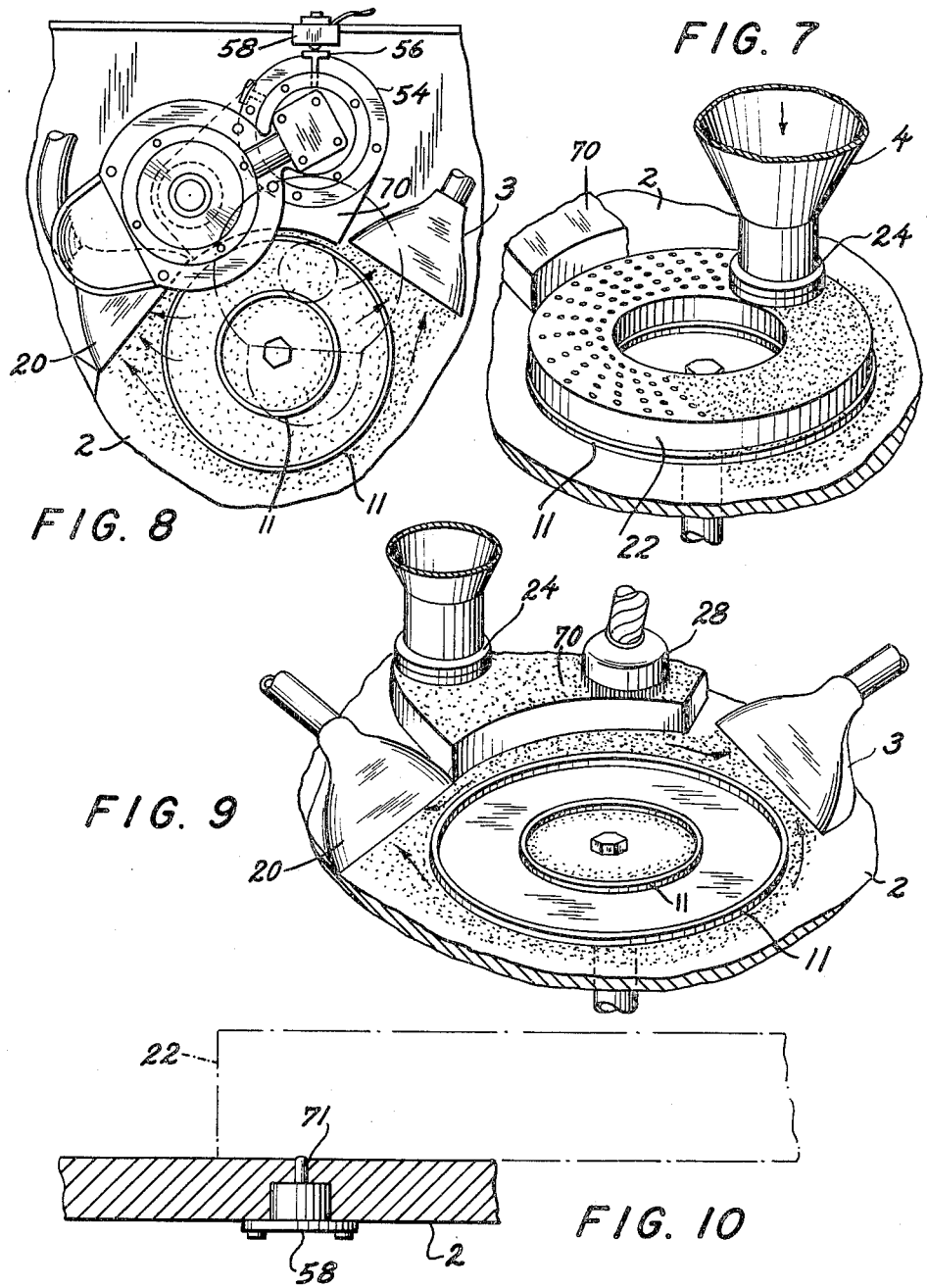

United States Patent Office 3,055,403
Patented Sept. 25, 1962

3,055,403
POWDER DE-DUSTER OR COLLECTOR APPARATUS FOR CAPSULE-FILLING MACHINES
Andreé R. Barresi, 1367 Chandler St.,
Far Rockaway, N.Y.
Filed Nov. 27, 1959, Ser. No. 855,738
2 Claims. (Cl. 141—93)

This invention relates in general to capsule filling apparatus and, in particular, to capsule filling apparatus having means for collecting the spillage which occurs as the capsules involved are being filled.

A typical procedure employed by capsule filling apparatus of the prior art involves first separating the capsules which are to be filled into their respective component parts, which are the capsule body, and the capsule cap which fits telescopically over the capsule body. In the prior art means are provided for automatically separating these capsules into their component parts and for positioning the capsule bodies in a predetermined alignment in a holding ring with the open end of the capsule bodies all aligned and ready for the filling operation. The capsule caps are similarly retained in a holding ring in readiness to be joined with the capsule bodies after the capsule bodies have been filled.

The capsule body holding ring is then moved under a hopper containing the ingredient which is to be inserted in the capsule bodies. The hopper is opened and the ingredient pours out of the ingredient hopper under the force of gravity into the open ends of the capsule bodies. As can be readily imagined there will be spillage of the ingredient over the surface of the capsule body holding ring and consequently over the edges of the capsule body holding ring. The capsule body holding ring and the capsule cap holding ring are then aligned and the capsule caps are forced over the open end of the capsule bodies thus sealing and containing the ingredient within the capsule.

It has been the practice in the prior art for years to manually brush this ingredient spillage into a can or other receptacle so that this ingredient spillage would not be completely wasted. When the capsules are filled with an ingredient which is comparatively expensive, it can be seen that this ingredient spillage and the inefficient collection procedure described will result in a large and unnecessary expense. It can also be readily seen that the operator of the capsule filling apparatus will have to spend a significant portion of his time in sweeping this spillage into the ingredient collection can. As is the case, this sweeping must be done quite regularly or the capsule filling apparatus will become clogged with this ingredient spillage after a relatively short amount of time, and this will result in higher maintenance and repair cost for the apparatus.

It is therefore, the object of this invention to provide an improved and economical capsule filling apparatus having automatic means for collecting the aforementioned ingredient spillage.

The invention will be more readily understood if the specification is read in conjunction with the figures of the drawing of which:

FIG. 1 is a perspective view of apparatus constructed in accordance with the invention.

FIG. 2 is a partial top plan view of the apparatus shown in FIG. 1, with the ingredients of the hopper being dispensed into the capsule bases.

FIG. 5 is a vertical sectional view taken on the lines 5—5 of FIG. 4.

FIG. 6 is a perspective view of some of the components of the apparatus shown in FIG. 1 and illustrates the relative position of the capsule hopper and rectifier and the capsule holding rings when the empty capsules are being separated into their component parts, that is, the capsule bodies and the capsule caps.

FIG. 7 is a perspective view of some of the components of the apparatus shown in FIG. 1 and illustrates the relative position of the capsule body holding ring and the ingredient hopper during the filling of the capsule bodies.

FIG. 8 is a partial top plan view of the apparatus shown in FIG. 1 and is somewhat similar to FIG. 2 but shows the hopper shifted from its dispensing position, which is illustrated in dot-dash lines, to its inoperative position at which it does not dispense, as illustrated by solid lines.

FIG. 9 is a perspective view of some of the components of the apparatus shown in FIG. 1 and illustrates a portion of the ingredient collection apparatus.

FIG. 10 is a partial sectional view of other apparatus which may be used in conjunction with or alternately with the disclosed apparatus.

Figure 3:
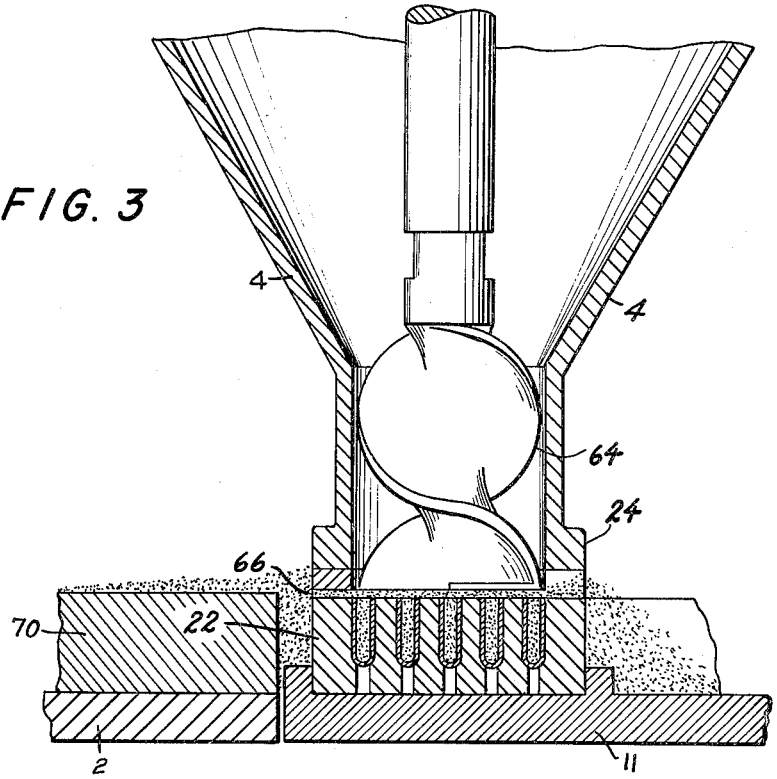
FIG. 3 is a vertical sectional view taken on the lines 3—3 of FIG. 2.

Referring now particularly to the drawings where like reference characters designate corresponding parts throughout all views, the numeral 2 designates a table to which is attached the various components which comprise the capsule filling apparatus. In this connection, the drawing illustrates a type of capsule filling machine to which my invention is applicable, and which is commercially available as No. 8 capsule filling machine of Eli Lilly and Company, of Indianapolis, Indiana. At the right hand portion of table 2 as illustrated in FIG. 1, there is provided a capsule rectifier 10, having a capsule hopper 8 attached thereto and into which the empty capsules which are to be filled are placed. Below rectifier 10 there is an indexing rotary head 16 upon which the capsule body and cap holding rings are placed for capsule loading and for the separation of the capsule bodies from the capsule caps. The element 18 represents an aperture through which a vacuum is applied to the underside of the capsule holding rings as the holding rings are indexed around by the rotary head 16, thereby causing the capsule bodies to be held in one ring and the capsule caps in the other. The element 12 indicates a convenient connection for the vacuum line which is utilized as indicated above.

In the center of the table 2, as illustrated in FIG. 1, the separated capsule bodies are filled. This capsule-filling station comprises: a capsule ingredient hopper 4, into which is placed the ingredient or ingredients which are to be contained within the capsules; a capsule body holding ring 22 positioned under the ingredient hopper 4; and a rotary head 11 (FIGS. 7, 8 and 9) which rotates the holding ring 22 under the nozzle 24, of the ingredient hopper 4. Handle 26 represents a speed control through which the speed of rotation of the rotary head 11 carrying the capsule body holding ring 22 may be adjusted. The drive mechanism and gearing by which the rotary head 11 which is carrying the capsule body holding ring 22 is driven and controlled is not illustrated for purposes of simplicity.

At the left hand portion of table 2, as illustrated in FIG. 1, there is the filled capsule joining mechanism 6 having attached thereto air lines 36 proceeding from an air compressor 38 and through an air compressor foot valve 40. The function of the capsule joining apparatus is to force the capsule cap telescopically over the capsule body and to collect the filled and joined capsules in a convenient container such as 84.

On the right hand side of table 2, as illustrated in FIG. 1, there lies the capsule separating apparatus which separates the empty capsules which are to be filled into a predetermined configuration of capsule bodies and capsule caps. Initially the capsule cap holding ring 44 (FIG. 6) and the capsule body retaining ring 22 are properly aligned by means of a registering mechanism such as for example a series of pegs in one of the two holding rings 44 and 22 and a series of complementary holes in the other. Thereafter the aligned rings 44 and 22 are placed upon the indexing rotary head 16 which is operated by gearing and drive mechanism not shown, but indicated as being manipulated by the control handle 42.

Next, although this may be done simultaneously or previously, capsules comprising capsule caps telescopically positioned over the bodies are placed in the capsule hopper 8 in any suitable manner such as being poured from a container. Lever or control handle 42 may be utilized to control the drive means which causes the indexing of the table head 16 and the operation of the rectifier head 10, and also may control the vacuum source which will be connected to element 12 in order to separate the capsule caps from the capsule bodies. However, individual control mechanism may be provided at the desire of the individual.

The capsule rectifier head 10 receives non-orientated capsules from the capsule hopper 8 and inserts them with the capsule bodies facing downward and the capsule caps facing upward into the capsule slots or ring 44. This may be accomplished by any of many mechanisms known in the art.

FIG. 6 illustrates the relative positions of the capsule rectifier 10 and the capsule holding rings 44 and 22 during that portion of the capsule filling operation where the capsule bodies and the capsule caps are separated. The capsule including the capsule body and cap is inserted into the round slots of ring 44 with the capsule body facing downward. Subsequently a vacuum is applied to the bottom of the capsule body and since the diameter of the slots in the capsule body retaining ring 22 are adapted to be less than the diameter of the capsule caps, the capsule caps will be retained in the capsule retaining ring 44 and the capsule bodies will be pulled into the capsule holding ring 22. The vacuum line 50 is connected on one end to a vacuum source, not shown, and on the other to the element 12 which is connected to the vacuum aperture 18 illustrated schematically in FIG. 1. The vacuum applied through aperture 18 to the capsules which are to be separated must be capable of causing the separation of the capsule body from the capsule cap. After all the slots have been filled by the rectifier head 10 and separated due to the vacuum source, the capsule cap retaining ring 44 may be positioned on the easel 52 for convenience. After the capsule body holding ring 22 has been filled with empty capsule bodies the ingredient filling operation begins.

In due course, the ingredients or ingredient which are to be utilized to fill the capsule bodies are placed in the ingredient hopper 4 by means of a scoop or funnel or any other suitable means. The ingredient which is placed in the ingredient hopper 4 settles to the bottom thereof under the force of gravity. However, to insure that there will be no clogging or coagulation of the ingredient as it flows to the bottom of the ingredient hopper, there is provided an auger 64 (FIG. 3) which is driven by gearing mechanism not shown and which insures that there will be a steady flow of the ingredient to the nozzle 24 of the ingredient hopper 4.

The capsule body holding ring 22 is now positioned on a rotary head 11, illustrated in FIGS. 7, 8 and 9, which is connected to a drive mechanism (not shown) under the control of a control lever 26 (FIG. 1). The speed of rotation of this rotary head 11 may be controlled to insure that the capsules will be properly filled.

The next step is to place the capsule caps over the now filled capsule bodies and to then collect the filled capsules in a convenient container. On the left side of table 2, as illustrated in FIG. 1, there is positioned the capsule closing mechanism 6. The capsule cap holding ring 44 which has been placed in a convenient location such as on easel 52 until this time and which contains the capsule caps is then aligned with the capsule body retaining ring 22 by means of any registration mechanism such as the pegs and holes previously mentioned. The capsules are now ready to be joined.

In order to properly close the capsules, a peg ring component 62, similar in principle to the peg ring illustrated in Patent No. 1,819,936, patented August 18, 1931, by W. Wilkie et al., is inserted in the closing mechanism 6. The pegs of the peg ring 62 utilized with the capsule closing apparatus 6 are arranged and aligned to fit into the round holes of the capsule cap and body holding rings 44 and 22. This peg ring is attached to a shaft which has a large flat steel movable plate on the end and responsive to which these pegs are movable in the peg ring. The rings 44 and 22 are then positioned on this peg ring until the aligned pegs begin to enter the capsule body retaining ring 22. Then the circular plate 80, illustrated in FIG. 1, is pulled down over the back of capsule cap retaining ring 44 and plate 80 locks in a neutral position forming a closing plate to brace the capsule cap ring 44 and the capsule body ring 22.

The capsules may now be joined by either a hand closing method, or by an automatic closing method which, as is illustrated in FIG. 1, can be pneumatically operated. The capsule holding rings 44 and 22 are braced against the closing plate 80 and the pegs in the peg ring are aligned with the holes in the capsule retaining rings 44 and 22. The air pressure provided by the compressor 38 and actuated by the air compressor foot lever 40 exerts a force against the previously mentioned flat steel plate which moves causing the pegs of the peg ring 62 to enter into and to push the capsule caps and the capsule bodies together. The circular plate 80 acts as a back plate and prevents the capsules from being ejected into the collector duct 82 before they are properly joined.

After the capsule caps have been pushed on the capsule body, the circular plate 80 is swung to its normal position, as illustrated in FIG. 1. The capsule holding rings 44 and 22 then can be pushed by hand further onto the peg rings until the capsules are ejected into the capsule collecting duct 82 which empties into the capsule collecting receptacle 84.

In brief, the capsule cap retaining ring 44 and capsule base retaining ring 22 are initially joined and mounted on the indexing rotary head 16 in capsule receiving position under the rectifier head 10. In this connection, the capsules are adapted to be indiscriminately supplied to the hopper 8 and from there fed down into the aligned apertures in the capsule rings 44 and 22 by means of the rectifier head 10. The capsules are then unjoined by the opening of the vacuum line 50 to thereby provide a vacuum at the aperture 18. The cap of the capsule being prevented from movement entirely through the associated ring aperture, is held in the upper ring 44, while the base of the capsule is drawn downwardly into the associated ring aperture in the lower ring 22, until it abuts against a shoulder formed therein. The associated rings 44 and 22 are rotated past or over the aperture 18 thereby assuring that all of the capsules are disassembled.

After the capsules have been unjoined, the upper ring 44 carrying the caps of the capsules is positioned on the easel 52. The lower ring 22 carrying the bases of the capsules is then positioned on the rotary head 11. The hopper 4 is then pivoted from its nondispensing or inoperative position at which the nozzle 24 cooperates with the retaining block 70 to seal the ingredients within the hopper 4, to its operative position at which the hopper ingredients are adapted to be dispensed through the opening of the nozzle 24 and fed into the bases of the capsules mounted in the ring 22. Simultaneously therewith, the rotary head 11 is actuated such that the base containing ring 22 is rotated relative to the nozzle 24 to thereby fill all of the capsule bases. In this connection, the opening of the nozzle 24 is preferably of a sufficient diameter to cover all of the radially aligned apertures in the concentrically arranged rows. Upon completion of the desired amount of ingredient dispensing, the hopper 4 is returned to its original position at which the ingredients are sealed therein through the cooperation of the nozzle 24 and the retaining block 70. At such time, the rotation of the base containing ring 22 is stopped.

After the bases of the capsules have been filled, the cap carrying ring 44 is placed on the base carrying ring on the rotary head 11, and the two rings are then positioned in the capsule closing and ejecting mechanism 6 where the caps are rejoined with the capsule bases. In this connection, the pegs of the peg ring 62 are aligned with the apertures in the capsule retaining rings 22 and 44 and, at the same time, the plate 80 pivoted downwardly forming a closure for bracing the caps of the disassociated capsules while they are being properly joined. The pegs of the peg ring 62 are forced into the apertures containing the disassociated capsules to thereby push the filled bases into engagement with the caps.

After the capsules have thus been joined together again the plate 80 is swung back to its original position and relative shifting effected between the pegs of the peg ring 62 and the aligned apertures in the retaining rings 22 and 44. Accordingly, the assembled capsules will be ejected from the retaining plates whereby the capsules will drop downwardly through the duct 82 into the collecting receptacle 84.

As can be readily seen from FIG. 3, there is a space 66 between the ingredient hopper nozzle 24 and the capsule retaining body ring 22. Therefore as the ingredient flows from the ingredient hopper 4 through the ingredient hopper nozzle 24, there is a spillage of the ingredient over the surface of ring 22 between the capsule body holding slots and consequently over the sides of this capsule body holding ring 22.

In order to somewhat limit this ingredient spillage the spacing between the nozzle 24 of the ingredient hopper 4 and the capsule body retaining ring 22 is kept at a minimum. However, as can be readily understood there still remains a significant amount of spillage both on the surface of the capsule body retaining ring 22 and also over the inside and outside diameter portions of the capsule body retaining ring 22. Because of the limited clearance 66 the filling table surface must be kept clean during the filling operation or the ingredient hopper nozzle 24 will dig into the aluminum ring 22 and result in various difficulties in separating and joining capsules in subsequent use.

After the capsule holding ring 22 has completed one revolution under the nozzle 24 and all the capsule bodies have been properly filled with the ingredient, the capsule body holding ring 22 is then removed from the rotating head 11. Since there is a relatively small clearance between the nozzle head 24 and the retaining ring 22, the ingredient hopper 4 and consequently the nozzle 24 is first rotated around the rotary head 54 to a position illustrated in FIGS. 8 and 9 and is positioned on the ingredient retaining block 70. Block 70 is at the same height as the retaining ring 22 and therefore there is also a relatively small clearance between the block 70 and the ingredient hopper nozzle 24 in order to retain the ingredient within the ingredient hopper 4.

For purposes of effectively collecting the ingredient spillage, collector nozzles 3, 20 and 28 are advantageously located along the top of table 2 adjacent the rotary head 11. As will be appreciated, nozzles 3 and 20 are stationary, whereas nozzle 28 is movable to any selected location. All three of these nozzles are connected to a particle separator 30 schematically illustrated in FIG. 1 and which serves to separate the collected ingredient spillage from the intake air and thereafter deposit it in receptacle 32. The vacuum for both the collection and separation of the ingredient spillage may be provided by any type of suitable vacuum source or means such as that employed in a conventional vacuum cleaner 14 actuated by the usual electrical means 34.

Mounted conveniently on the rotary head 54 there is a micro-switch actuating element 56 which cooperates with a micro-switch 58 mounted on any convenient mounting bracket in a spaced relationship as illustrated in FIGS. 2 and 8. When the ingredient hopper 4 is swung into its filling position, that is over the capsule body retaining ring 22 and the capsule bodies are being filled as the table head rotates, the actuating element 56 and the micro-switch 58 are in the position illustrated in FIG. 2. When the capsule bodies have been filled and the ingredient hopper has been rotated out of the way and onto the ingredient retaining block 70, the micro-switch actuating element 56 and the micro-switch 58 are in the position illustrated by solid lines in FIG. 8. In this latter position the micro-switch 58 closes a circuit which actuates the vacuum source 14. The vacuum source 14 causes a vacuum to exist in the lines leading to the vacuum nozzles 3, 20 and 28.

Figure 4:
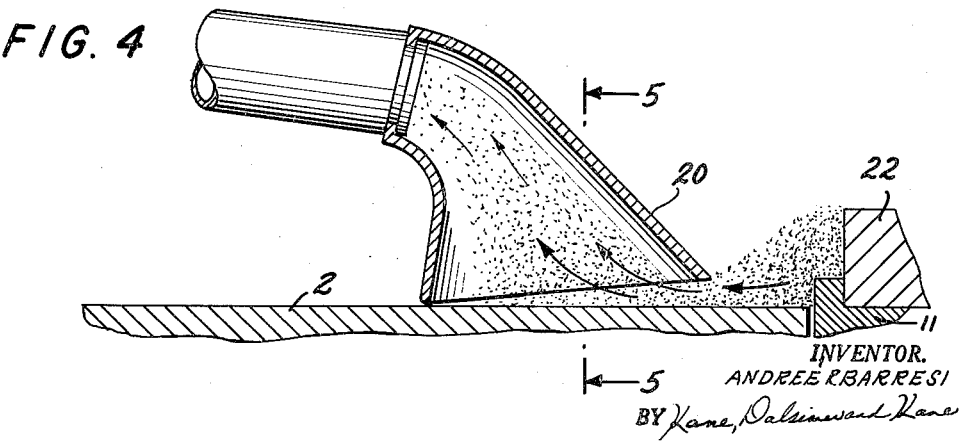
FIG. 4 is a vertical sectional view taken on the lines 4—4 of FIG. 2.

As can now be seen, during that portion of the capsule body filling cycle that no capsule bodies are being filled with the ingredient, the micro-switch 58 and the micro-switch activating element 56 are so arranged that the vacuum source 14 is on and is collecting the ingredient spillage from the capsule filling area, through nozzles 3, 20 and 28 as is illustrated by the FIGS. 8 and 9. FIG. 4 illustrates one of the nozzles, nozzle 20, and the arrows represent the particles of ingredient spillage being drawn into the vacuum line attached to the nozzle 20. These particles are then drawn into a particle separator schematically represented as 30, which may be of any type known in the art. The ingredient particles which have been separated from the air are then deposited in the ingredient collection container 32 and when this container is sufficiently filled, it is emptied back into the ingredient hopper 4. FIGS. 1 and 9 illustrate all three vacuum nozzles utilized in the described embodiment of the invention. The nozzles 3 and 20 are fixed or stationary while the nozzle 28 is movable. Nozzle 28 is best utilized if there are out of the way portions, where the ingredient spillage does collect, and may be attached to a spring which will cause it to return to a permanent resting position, whenever it is not in use.

The vacuum supplied by the vacuum source 14 should be of sufficient strength and the vacuum nozzles 3 and 20 (and there obviously can be a greater or lesser number of nozzles) should be positioned such that the ingredient loading area is kept clear of ingredient spillage.

One can easily appreciate that the micro-switch 58 and the micro-switch actuating element 56 need not be necessarily positioned as illustrated in FIGS. 2 and 8. The micro-switch 58 may for example be positioned in the bed of table 2 as illustrated in FIG. 10. The micro-switch actuating element in this example would be the capsule body holding ring 22. There would be a slight variation of course and the micro-switch 58 would have to be chosen or its associated circuitry so arranged that the vacuum source 14 would only be "on" when the micro-switch is not actuated or in other words when the plunger 71 is released.

Regardless of the positioning of the micro-switch it is to be understood that the vacuum is to be "on" during that portion of the capsule filling cycle, that the ingredient hopper 4 is over the block 70 and therefore incapable of dispensing the ingredient into the capsule bodies and the capsule body holding ring 22 is removed from the rotary head 11 and readied for the next step or the capsule closing step.

While one embodiment of the inventive idea has been described, it is to be clearly understood that this description is for the purpose of illustration only and is not to be construed as definitive of the limits to which the inventive principle may be applied.

Thus my invention is illustrated as applied to one specific type of capsule filling machine available on the market i.e. the No. 8 capsule filling machine of Eli Lilly and Company, of Indianapolis, Indiana. However, it should be appreciated that my invention is also applicable to other types of capsule filling machines.

What I claim is:

1. In combination in a capsule filling device, holding means for an aligned and orientated plurality of capsule bodies, hopper means for receiving the ingredient to be contained in said plurality of capsule bodies and operably associated with said holding means, means for permitting said hopper means to assume a first and second position, said hopper means capable of dispensing said ingredient into said capsule bodies when said hopper means is in said first position and incapable of dispensing said ingredient into said capsule bodies when said hopper means is in said second position, drive means for driving said holding means in a predetermined path such that said plurality of capsule bodies are systematically presented to said hopper means when said hopper means is in said first position whereby said capule bodies are filled with said ingredient in a predetermined manner, and collection means comprising a vacuum means operable only when said hopper means is in said second position to recover and selectively deposit the ingredient spillage which occurs when said hopper means is in said first position in a container therefor, said vacuum means including a vacuum source and a vacuum nozzle coupled therewith, said nozzle being adjacent to the capsule filling area.

2. In a capsule filling device, a capsule body holding and positioning ring having a plurality of capsule bodies arranged therein such that said capsule bodies are aligned in a predetermined orientation, an ingredient hopper means adapted to receive the ingredient to be contained in said capsule bodies and capable of dispensing said ingredient into said capsule bodies when said hopper is in a first position and incapable of dispensing said ingredient into said capsule bodies when said hopper means is in a second position, means for permitting the hopper means to assume said first and second positions, drive means for rotating said holding ring under said hopper means at a predetermined rate when said hopper means is in said first position whereby said capsule bodies are filled with said ingredient in a predetermined manner, means for collecting the ingredient spillage which occurs when said hopper means is in said first position and operable only when said hopper means is in said second position comprising a vacuum nozzle having associated therewith a vacuum source and an ingredient separator, said vacuum nozzle positioned adjacent said ingredient hopper means and said holding ring such that the ingredient spillage is collected thereby, and said ingredient separator positioned in said vacuum system between said vacuum source and said nozzle wherein said ingredients are separated from the inflowing air.

References Cited in the file of this patent

UNITED STATES PATENTS

| | | |
|---|---|---|
| 332,204 | Krehbiel | Dec. 8, 1885 |
| 578,985 | Grove | Mar. 16, 1897 |
| 1,169,873 | Sanborn | Feb. 1, 1916 |
| 1,819,936 | Wilkie et al. | Aug. 18, 1931 |
| 2,655,301 | Riemer | Oct. 13, 1953 |
| 2,839,102 | Kido | June 17, 1958 |
| 2,922,443 | Jones et al. | Jan. 26, 1960 |